May 1, 1956　　　　　　D. I. HAYES　　　　　2,743,828
SELF-LOADING TRANSPORT VEHICLE AND DUMP GATE THEREFOR
Filed Jan. 17, 1955　　　　　　　　　　　　7 Sheets-Sheet 1

INVENTOR.
Dale I. Hayes
BY
Fred Wells
Atty.

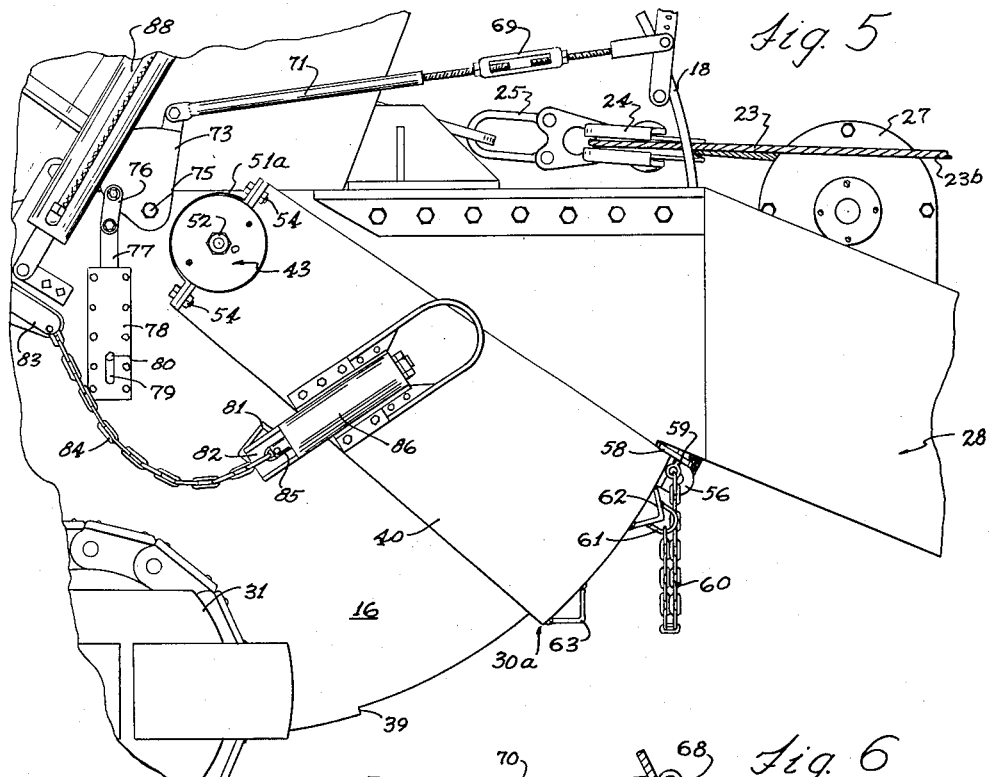
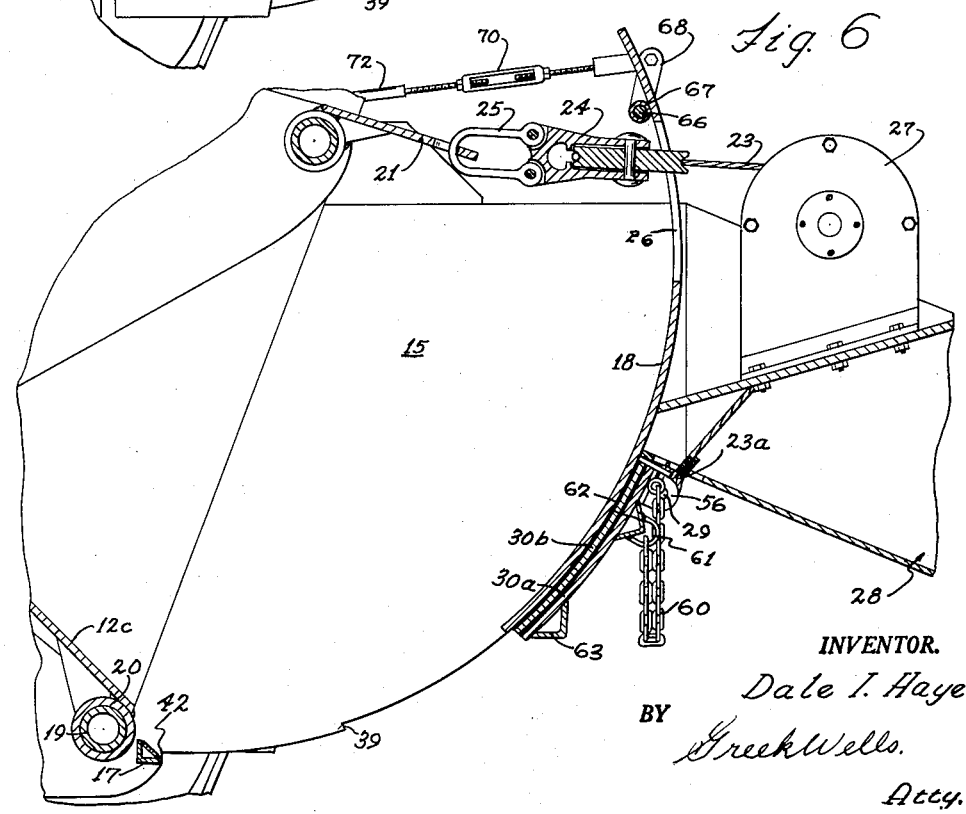

May 1, 1956 D. I. HAYES 2,743,828
SELF-LOADING TRANSPORT VEHICLE AND DUMP GATE THEREFOR
Filed Jan. 17, 1955 7 Sheets-Sheet 6
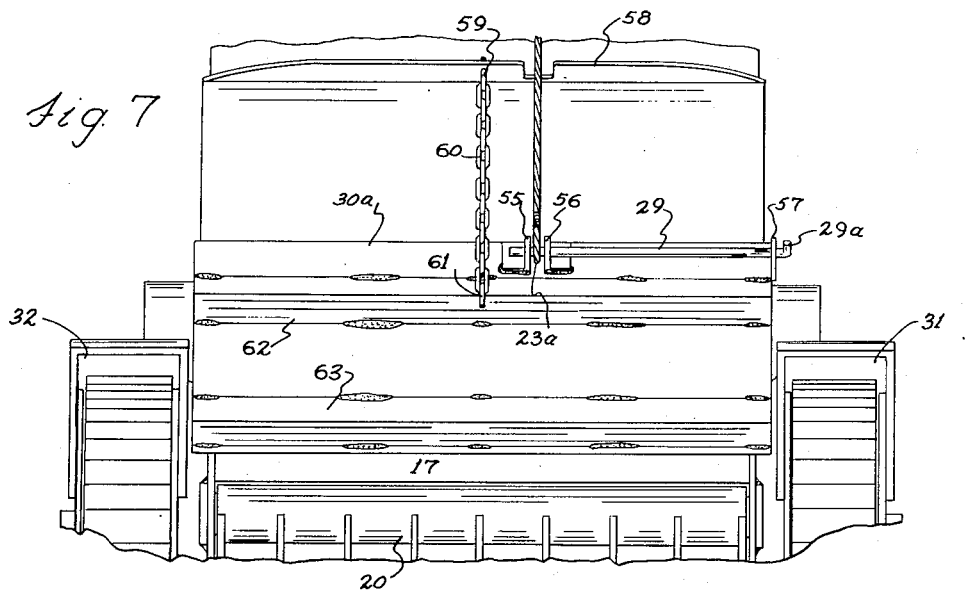
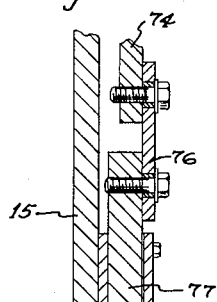
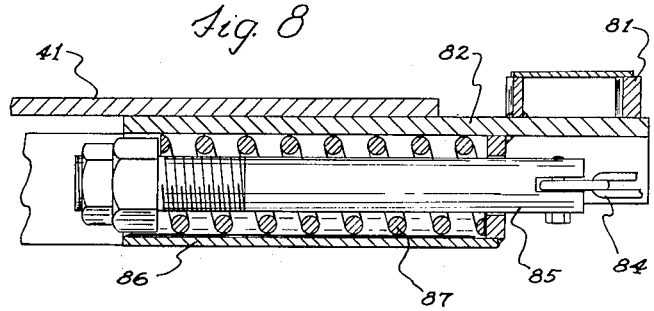
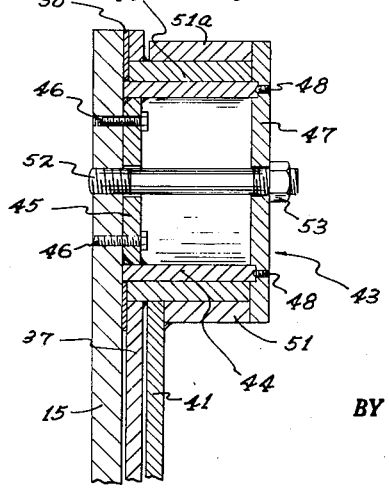
INVENTOR.
Dale I. Hayes
BY
Creek Wells.
Atty.

May 1, 1956 D. I. HAYES 2,743,828
SELF-LOADING TRANSPORT VEHICLE AND DUMP GATE THEREFOR
Filed Jan. 17, 1955 7 Sheets-Sheet 7

INVENTOR.
Dale I. Hayes
BY Green Wells.
Atty.

United States Patent Office 2,743,828
Patented May 1, 1956

2,743,828

SELF-LOADING TRANSPORT VEHICLE AND DUMP GATE THEREFOR

Dale I. Hayes, Spokane, Wash., assignor to American Zinc, Lead and Smelting Company, St. Louis, Mo., a corporation of Maine Application January 17, 1955, Serial No. 482,009

12 Claims. (Cl. 214—78)

My invention relates to a self loading transport and the dump gate therefor. In my prior Patent No. 2,518,471, there is disclosed a self loading transport wherein a shovel composed of side walls and a bottom wall but open at the back, and is pivoted at its rear lower edge in a trough which is composed of side walls and a bottom wall, and the trough in turn is pivoted at its lower rear edge in the body of the transport so that loose aggregate to be loaded is crowded into the shovel and then worked back into the body by manipulating the shovel and the trough. The present invention is directed to a mechanism whereby the load receiving body of the transport is provided with a dump gate for emptying it and the dump gate is operated by the same means that operates the shovel and the trough.

It is a purpose of the present invention to provide a novel dump gate construction with means whereby to operate the same through the shovel manipulating mechanism of the self loading transport.

It is also a purpose of the present invention to provide a dump gate control mechanism in combination with the self loading transport wherein the weight of the shovel and trough mechanism is utilized to close the dump gate positively and a latch device keeps the dump gate closed during the load manipulation of the shovel and trough.

A further object of the present invention is to provide a self loading transport of the character described with a novel dump gate construction which is self cleaning and avoids damage due to particles being caught in the gate construction.

Other objects and advantages of the invention will appear from the following description and the accompanying drawings wherein a preferred form of the invention is shown. It should be understood, however, that the drawings and description are illustrative only and are not intended to limit the invention except insofar as it is limited by the claims.

In the drawings:

Figure 5 is a fragmentary side view of the rear portion of the machine showing the dump gate opened;

Figure 6 is a sectional view taken on the line 6—6 of Figure 2, but showing the parts in the dump position illustrated in Figure 5;

Figure 7 is a fragmentary bottom plan view looking up at the dump gate in the direction indicated by the lines 7—7 on Figure 3;

Figure 8 is an enlarged fragmentary sectional view taken on the line 8—8 of Figure 4;

Figure 9 is an enlarged fragmentary sectional view taken on the line 9—9 of Figure 4;

Figure 10 is an enlarged fragmentary sectional view taken on the line 10—10 of Figure 4.

Figure 1:
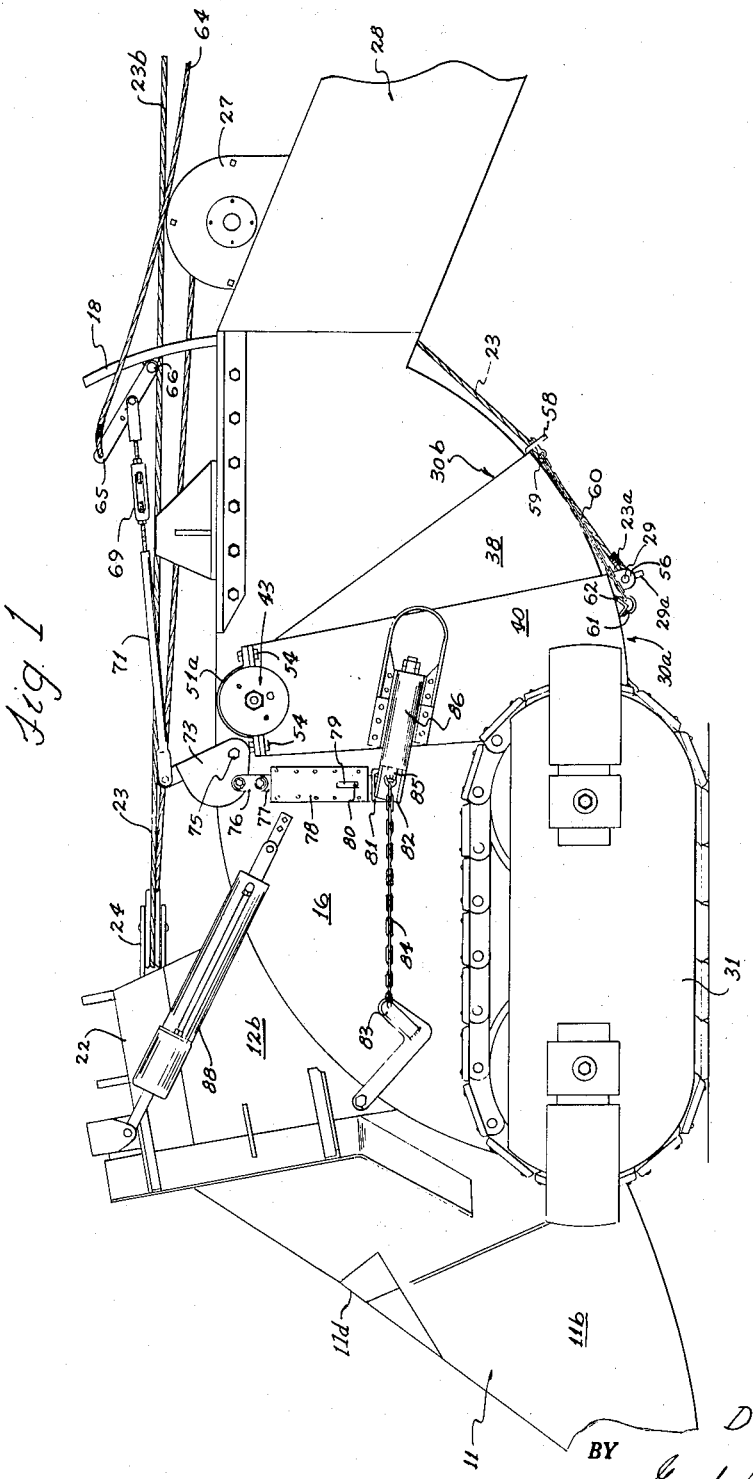
Figure 1 is a view in side elevation of a self loading transport machine embodying my invention.
Figure 2:
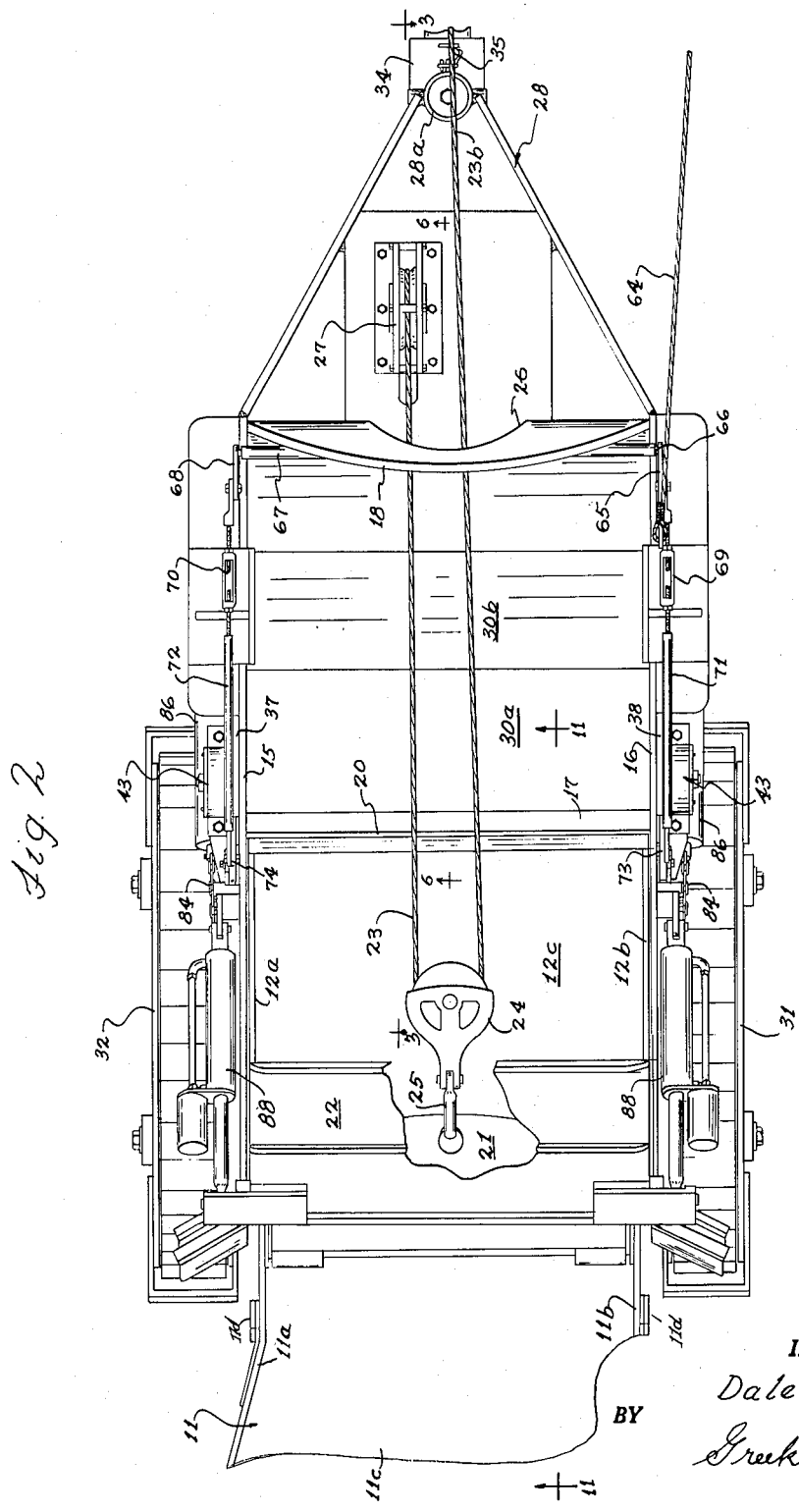
Figure 2 is a plan view of the machine.
Figure 3:
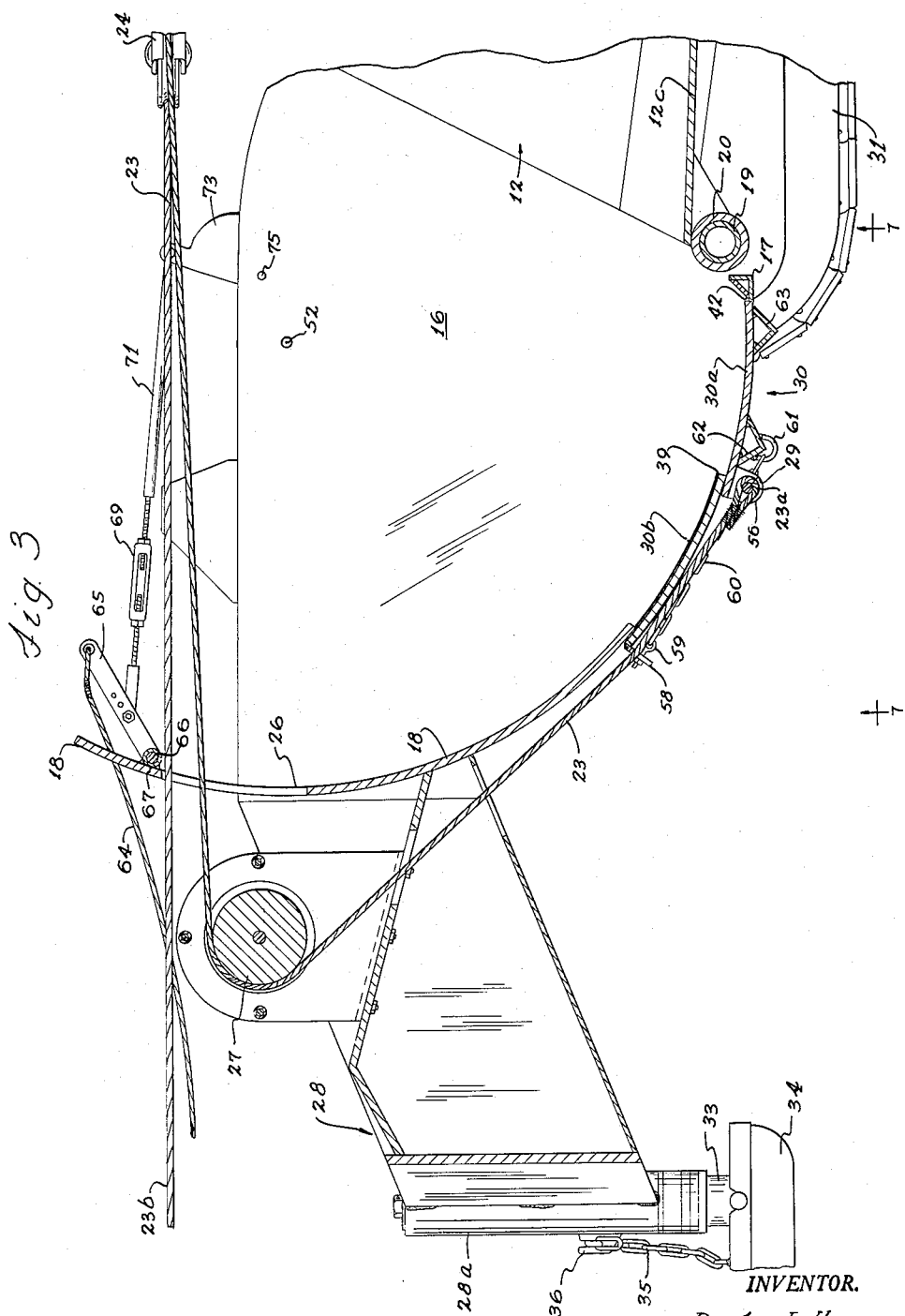
Figure 3 is a sectional view taken on the line 3—3 of Figure 2, but on an enlarged scale.

In the self loading transport machine to which my invention is applied, a shovel 11 is pivotally supported at its rear lower edge by a trough 12. The shovel 11 has side walls 11a and 11b and a bottom wall 11c but it is open at the back so that the material picked up by the shovel can be crowded back into the trough 12 by simply rocking the shovel on its pivotal mounting to the trough. The trough 12 has side walls 12a and 12b and a bottom wall 12c, but is also open at the back. The shovel 11 is pivoted at its rear edge to the trough 12 by pivot members 13 and 14 mounted on the shovel 11 and the trough 12 respectively.

The trough 12 is pivoted between side walls 15 and 16 of the machine. These side walls 15 and 16 are joined by a cross bar 17 and a rear wall 18 to provide a loading body. The side walls 15 and 16 are also connected by a tubular member 19 which provides a pivotal mounting for a tubular member 20 at the rear lower edge of the trough 12. It will be evident from the foregoing description that the aggregate picked up by the shovel 11 can be rocked back onto the trough 12 by lifting the front end of the shovel and that the aggregate in the trough 12 can be worked back into the loading body of the machine by rocking the trough 12 and the shovel upwardly about the pivotal axis provided by the members 19 and 20. The manipulation of the shovel 11 and the trough 12 is accomplished by providing a cross yoke 21 on the top of the shovel connecting the top ends of the side walls 11a and 11b and providing stop means 11d on the shovel to engage the trough side walls 12a and 12b. The trough is provided with a top cross yoke 22 connecting the side walls 12a and 12b.

A pull cable 23 is connected to the cross yoke 21 by a sheave unit 24 and a clevis 25. The cable extends rearwardly through an opening 26 in the rear wall 18 of the body of the machine. The cable extends over a sheave 27 which is mounted on a rear end support 28 for the machine and extends downwardly from the sheave 27 behind the wall 18 where it is anchored by a loop 23a to a pin 29 on a dump gate 30 which closes the bottom of the loading body of the machine. It is believed to be obvious that by pulling on the free portion 23b of the cable 23, the shovel 11 can be lifted and when the shovel stop means 11d engages the front edges of the trough 12, the trough 12 can be rocked about its pivots 19 and 20.

The front portion of the self loading transport which has just been described, is supported by crawler track units 31 and 32 and the rear portion of the transport is supported by a pedestal 33 which rests on a member 34 that is carried by a suitable powered vehicle. The pedestal 33 is supported for forward and rearward rocking motion on the member 34 and the support 28 pivoted on the pedestal 33 so as to provide for pivotal movement of the support 28 about the pedestal. A chain 35 or other suitable means is used to secure the support 28 on the member 34 so that it cannot bounce off. The sleeve 28a carries a hook 36 for securing the chain 35.

The dump gate 30 is composed of two sections 30a and 30b. The section 30b is U-shaped with its side portions 37 and 38 that extend up outside the walls 15 and 16 of the loading body. The loading body is open between the back wall 18 and the cross member 17 so as to provide a bottom dump opening. The side walls 15 and 16 are notched at 39 to provide a stop for the gate section 30b. The gate section 30a has side portions 40 and 41 which overlap the side portions 37 and 38 of the gate portion 30b. The front edge of the gate section 30a is adapted to abut the cross member 17 when it is in closed position and the side walls 15 and 16 are shouldered as indicated at 42 to provide abutments for the gate section 30a.

As illustrated best in Figure 10, the upper ends of the side portions 37 and 38 of the gate section 30b and the upper ends of the side portions 40 and 41 of the gate section 30a are pivoted on a common axis near the tops of the side walls 15 and 16. A hollow bearing 43 is provided on each of the side walls 15 and 16. This bearing is made up of a tubular section 44 which has one end closed by a plate 45 that is set in the cylindrical section and welded in place. The plates 45 are bolted to the side plates 15 and 16 by bolts 46. A circular cover plate 47 is secured to the section 44 by screw bolts 48. Each of the side portions 37 and 38 has a cylindrical sleeve 49 secured thereto which embraces the cylindrical section 44. A washer 50 is interposed between the body side plate 15 or 16 and the adjacent sleeve 49 as a wear plate. Each of the side walls 40 and 41 has a cylindrical sleeve 51 thereon which is rotatably mounted on the sleeve 49. The plate 47 is further held in place by a central bolt 52 which is threaded into the side wall 15 or 16 and which extends through the plate 47 to receive a nut 53. The sleeve 51 is a split sleeve having its top half 51a removable as indicated in the drawings, so that the gate section 30a can be dropped down by simply removing two bolts 54. In order to remove the gate section 30b, it is necessary to remove the bearing member 43 from the side wall of the body.

The dump gate 30 is adapted to be opened by a pull on the cable 23. As explained heretofore the cable 23 is connected to the gate section 30a by a cross pin 29. This cross pin 29 extends between two ears 55 and 56 which are mounted on the gate section 30a (see Figure 7). The pin 29 is manually removable. It extends through a guide plate 57 at one side edge of the gate section 30a and has a handle portion 29a thereon. The gate section 30b has an outwardly extending flange 58 at its rear edge. This flange is positioned to engage the rear edge of the gate section 30a so that when the gate section 30a is pulled back, it will also pull back the gate section 30b. The flange 58 is also utilized to connect an eye bolt 59 in one end of a chain 60. The other end of the chain 60 is connected to a loop 61 that is mounted on an angle iron brace 62 which extends across the bottom of the gate section 30a. The gate section 30a has another angle iron brace 63 near its front edge which serves as a reenforcement and as a means for preventing damage in case a large rock is encountered as it will ride over the rock. The chain 60 causes the gate section 30b to be pulled into closed position by the gate section 30a when the gates are being closed.

Since the cable 23 is directly connected to the gate section 30a, it is obvious that the tension on the cable necessary to lift the shovel 11 will be communicated to the gate section 30a and the cable will thus tend to open the gate 30 at any time that the shovel 11 is lifted. It is necessary therefore to latch the gate in closed position in order that the cable 23 may be anchored by the gate section 30a during the normal filling of the transport body and the movement of the load to the dump position. Duplicate latch mechanisms are provided on both sides of the machine and they are connected together in such a fashion that one trip cable 64 may operate both of them. The trip cable is connected to a lever 65 which is fixed to one end of a cross shaft 66. This cross shaft extends through a tube 67 that is mounted on the back wall 18 of the body and carries another lever 68. The levers 65 and 68 are connected by turnbuckles 69 and 70 and links 71 and 72 to a pair of latch lifting members 73 and 74. Each lifting member 73 or 74 is pivoted on the adjacent side wall 15 or 16 by a pivot pin 75. A link 76 depends from each of the members 73 and 74. The lower end of the link 76 is pivoted on a latch pin 77 which is slidable within a guide member 78 that is bolted to the adjacent side plate 15 or 16 of the body. The guide member 78 has an elongated slot 79 therein which receives a pin 80 that is threaded into the latch bar 77. The pin 80 serves as a limiting device to limit the up and down movement of the bar 77.

The latch bar 77 is adapted to engage in a keeper 81 that is mounted upon a plate 82. The keeper 81 and the plate 82 are carried by the gate section 30a, being bolted thereto as shown best in Figures 4 and 5. It will be appreciated that when the latch bar 77 is engaged in the keeper 81, the plate 82 and the gate section 30a will be locked against opening. Since there are latch bars 77 on both sides of the machine and plates 82 on both of the side walls 40 and 41 of the gate section 30a, the gate section 30a is locked sufficiently to serve as an anchor for the cable 23 when this cable is being used to manipulate the shovel 11 and the trough 12 to fill the transport body.

Figure 4:
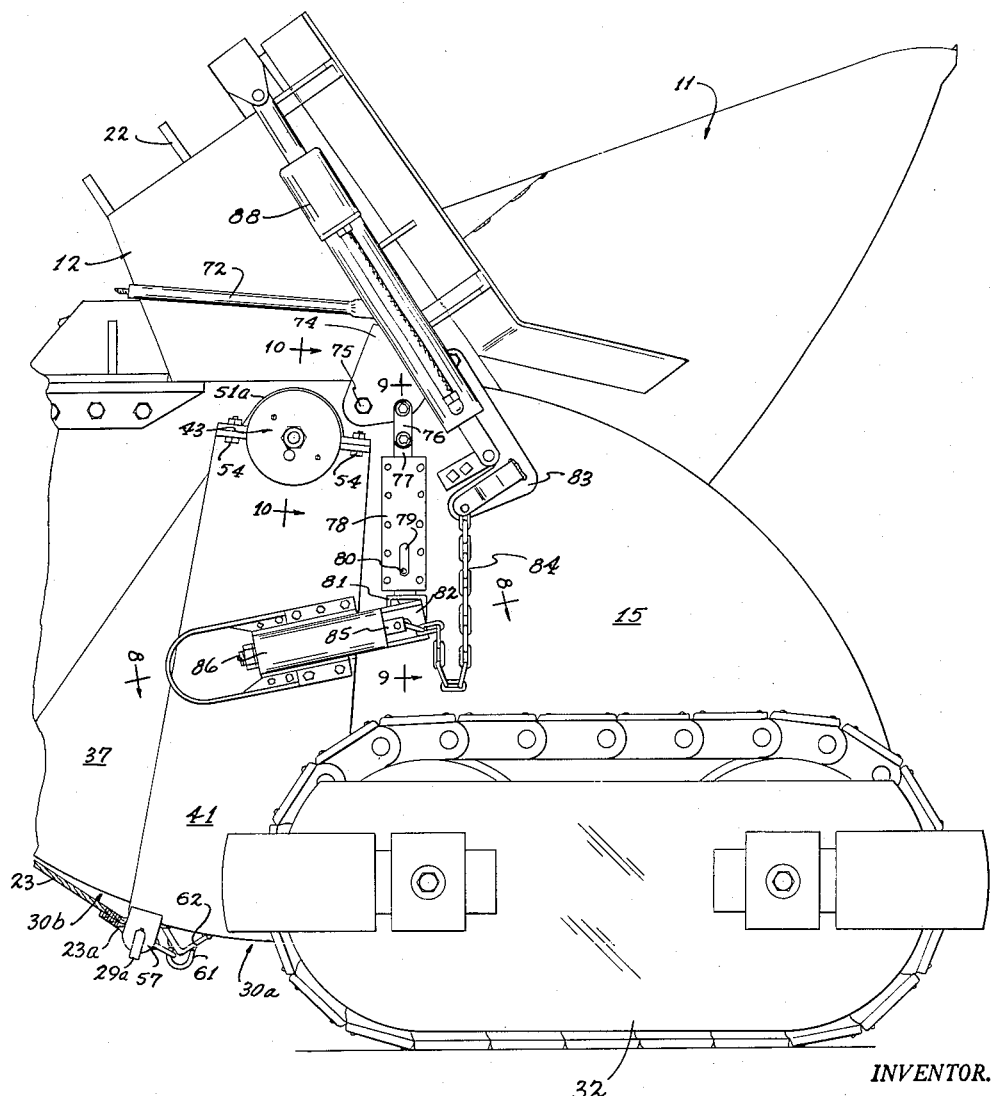
Figure 4 is a side view of the front portion of the machine showing the opposite side of the machine from that shown in Figure 1, and showing the machine in a different position.
Figure 11:
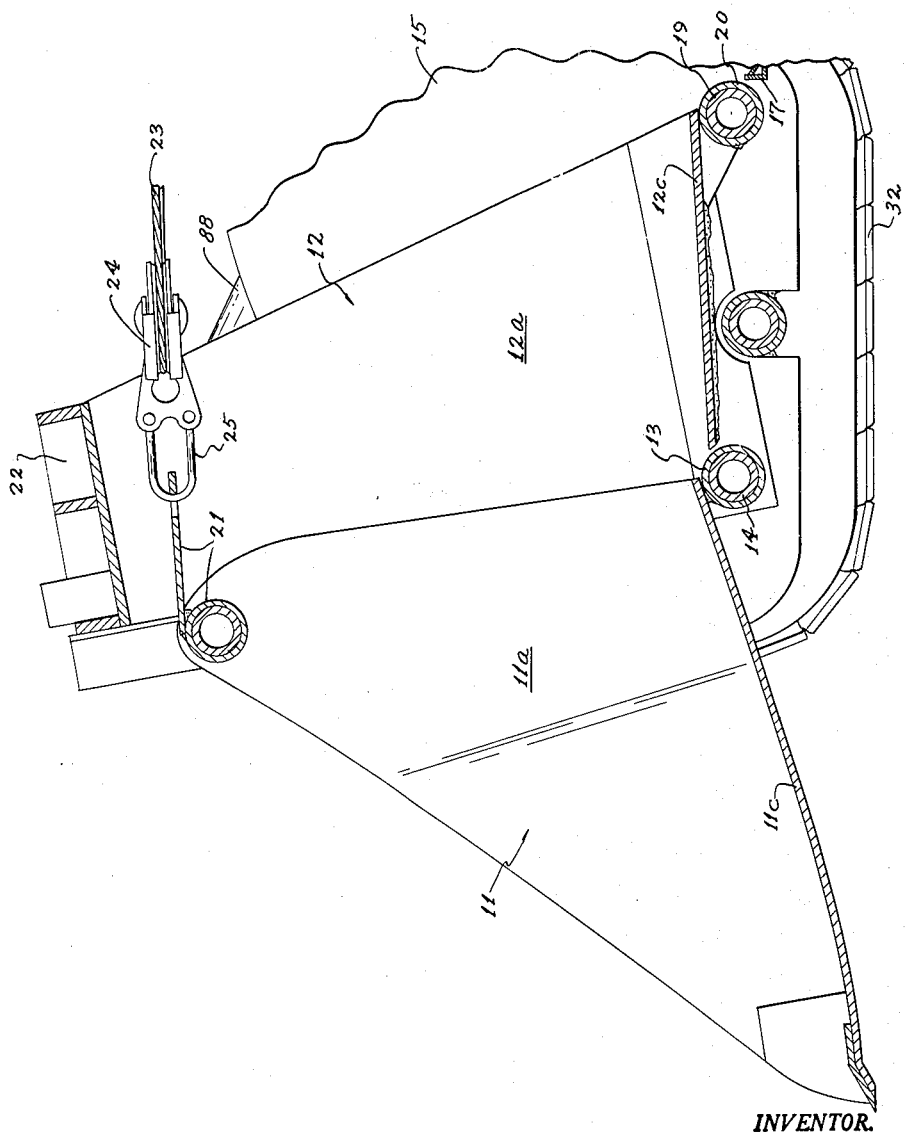
Figure 11 is an enlarged fragmentary section view taken on the line 11—11 of Figure 2.

In order to open the dump gate 30 when the transport is loaded and the shovel is raised as shown in Figure 4 of the drawings, all the operator has to do is to release the latch bar 77 by using the trip cable 64. When he releases the latch bars 77, the operator frees the gate section 30a so that the load tending to lower the shovel 11 now also tends to open the dump gate 30. If this is not sufficient to open the dump gate 30, the operator can apply additional pull through the cable 23 directly on the dump section 30a to start it to opening. By doing this the operator can keep the shovel 11 raised and open the gate 30 to its fullest extent to dump the contents of the transport.

Since the operator has control of the transport only through the cable 23, the trip cable 64 and the support connection at 34 on the powered vehicle, some means must be provided to close the dump gate 3 with this arrangement. The trough 12 is connected to the gate section 30a by means of brackets 83 and chains 84 which extend down to bolts 85 that are mounted in spring housings 86 on the plates 82, the bolts 85 extending through the springs 87 in the housings 86 so as to provide a yielding connection from the chains 84 to the plates 82. The springs 87 are heavy duty springs so that they require considerable pull to compress them. When the trough 12 moves forward from the position shown in Figure 4 to the position shown in Figure 1, its brackets 83 are swung forward with it so as to exert a pull through the chains 84 on the gate 30. In the full lowered position of the trough 12 the chains 84 will pull the plates 82 and the keepers 81 into position to receive the latch bars 77. In this way the operator can close the dump gate and latch it without any special mechanism other than the parts already described. It should be understood that the latch bars 77 are gravity closing and tend to drop down to latching position because of their weight. The trough 12 is prevented from swinging forward with too great a force by using well known dash pot check members 88 which are connected to the trough and to the side walls 15 and 16.

The present invention utilizes the specific parts hereinbefore described as a simple means to load and unload the transport body composed of the rear wall 18, the spaced side walls 15 and 16, the trough 12, the shovel 11 and the dump gate 30. The side walls 16 and 16 have lower circular edges curving upwardly toward the rear wall to fit the bottom portions of the dump gate sections 30a and 30b. The open bottom is between the means composed of the members 17 and 19 that connect the side walls forwardly of the circular edges and the rear wall. It provides a discharge opening. The parts 44—48 provide pivots for the dump gate sections 30a and 30b. The parts 29, and 56—62 provide means to connect the dump gate 30 to the pull cable 23 so that the pull of the cable 23 acts against the weight of the shovel to swing the dump gate 30 rearwardly into overlapping relation to the rear wall 18. The latch pin 77 and the keepers 81 with the associated parts, form a latch that normally holds the dump gate 30 in closed position. The trip cable 64 and parts 65 to 76 inclusive, form a trip to release the latch. The means connecting the trough 12 to the dump gate 30 to cause the trough to bring the dump gate 30 to closed position when the trough moves forward and downward to horizontal loading position, is made up of the parts 82 to 87 inclusive. The operator uses the same control means, the pull cable 23, to manipulate the shovel and trough in loading and to open the dump gate 30. The only additional control member he needs is the trip to open the latch.

It is believed that the nature and advantages of the invention will be clear from the foregoing description.

Having thus described my invention, I claim:

1. In a self loading transport having a load receiving body comprising a rear wall, side walls formed to the rear wall and having lower circular edges curving upwardly and rearwardly toward the rear wall, and means joining said side walls together forwardly of said curving lower edges, the body having an open bottom between said means and the rear wall, a U-shaped dump gate pivoted on said side walls at the axis of the circular edges and providing a closure covering the open bottom of the body, said dump gate being swingable rearwardly into overlapping relation with the rear wall, a U-shaped trough pivoted at its lower rear edge to said body, said trough being rockable from a horizontal load receiving position upwardly and rearwardly between said side walls to crowd material thereon into said body, a trough like shovel extending forwardly from said trough and pivoted at its lower rear edge to the trough, said shovel being rockable from a horizontal load receiving position upwardly and rearwardly between the side walls of the trough to crowd material thereon into the trough, means on the shovel engaging the trough when the shovel is rocked upwardly beyond a certain angle with respect to the trough, to rock the trough and shovel upwardly and rearwardly together, a sheave unit on the shovel, a pull cable anchored to said dump gate and extending rearwardly and upwardly behind the rear wall and then forwardly around the sheave unit and then rearwardly, said cable being operable to raise the shovel and trough about their pivots, a latch normally holding the dump gate in closing position, a trip for opening the latch, the pull of the cable on the dump gate acting against the shovel weight upon opening the latch to swing the dump gate rearwardly into overlapping relation with said rear wall, and means connecting the dump gate to the trough operable to return the dump gate to closing position upon forward and downward movement of said trough to its load receiving position.

2. In a self loading transport having a load receiving body comprising a rear wall, spacing side walls having lower circular edges curving upwardly and rearwardly toward the rear wall, and means joining said side walls together forwardly of said curving lower edges, the body having an open bottom between said means and the rear wall, a U-shaped dump gate pivoted on said side walls at the axis of the circular edges and providing a closure covering the open bottom of the body, said dump gate being swingable rearwardly into overlapping relation with the rear wall, a U-shaped trough pivoted at its lower rear edge to said body, said trough being rockable from a horizontal load receiving position upwardly and rearwardly between said side walls to crowd material thereon into said body, a trough like shovel in front of said trough and pivoted at its lower rear edge to the trough, said shovel being rockable from a horizontal load receiving position upwardly and rearwardly between the side walls of the trough to crowd material thereon into the trough, a sheave unit on the shovel, a pull cable anchored to said dump gate and extending rearwardly and upwardly behind the rear wall and then forwardly around the sheave unit and then rearwardly, whereby said cable is operable to raise the shovel about its pivot, a latch normally holding said dump gate in closing position across the open bottom and a trip operable to release said latch, the pull of the cable on the dump gate acting against the shovel weight, upon release of the latch, to swing the dump gate rearwardly into overlapping relation with said rear wall.

3. In a self-loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, the improvement comprising a dump gate movably suspended from the body and providing a movable closure for said discharge opening, latch means on the body holding the dump gate in position to close the opening, a trip operable to release the latch means, a pull cable anchored to the dump gate for opening it, a sheave unit attached to the shovel, and means on the body guiding the cable from the dump gate to the sheave unit, the pull of the cable on the dump gate acting against the shovel weight upon release of the latch means to open the dump gate.

4. In a self-loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, the improvement comprising a dump gate movably suspended from the body and providing a movable closure for said discharge opening, latch means on the body holding the dump gate in position to close the opening, a trip operable to release the latch means, a pull cable anchored to the dump gate for opening it, means connecting the trough to the dump gate operable to bring the dump gate into position to close the discharge opening upon movement of the trough to its load receiving position, a sheave unit attached to the shovel, and means on the body guiding the cable from the dump gate to the sheave unit, the pull of the cable on the dump gate acting against the shovel weight upon release of the latch means to open the dump gate.

5. In a self-loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, the improvement comprising a dump gate movably suspended from the body and providing a movable closure for said discharge opening, latch means on the body holding the dump gate in position to close the opening, a trip operable to release the latch means, a pull cable anchored to the dump gate for opening it, and means connecting the trough to the dump gate operable to bring the dump gate into position to close the discharge opening upon movement of the trough to its load receiving position.

6. In a self-loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, the improvement comprising pivots on the side walls of said body, a dump gate comprising two overlapping U-shaped gate sections mounted on said pivots and extending across the body beneath said discharge opening to provide a closure therefor, latch means on the body engaging one of the gate sections to hold it in closing position, means connecting the other gate section to the gate section engaged by said latch to hold it in closing position, a pull cable connected to the shovel and operable to lift the shovel upwardly, means connecting the cable to the latch engaged gate section operable to pull it over the other gate section and to swing both gate sections on the pivots away from the discharge opening upon release of the latch means.

7. In a self-loading transport having a load receiving body comprising a rear wall, spacing side walls having lower circular edges curving upwardly and rearwardly toward the rear wall, and means joining said side walls together forwardly of said curving lower edges, the body having an open bottom between said means and the rear wall, a U-shaped trough pivoted at its lower rear edge to said body, said trough being rockable from a horizontal load receiving position upwardly and rearwardly between said side walls to crowd material thereon into said body, a trough like shovel in front of said trough and pivoted at its lower rear edge to the trough, said shovel being rockable from a horizontal load receiving position upwardly and rearwardly between the side walls of the trough to crowd material thereon into the trough, and a pull cable operably connected to the shovel to rock it, the improvement comprising a dump gate pivoted on said side walls at the axis of the circular edges and providing a closure covering the open bottom of the body, said dump gate being swingable rearwardly into overlapping relation with the rear wall, a latch normally holding the dump gate in closing position across the open bottom, a trip operable to release the latch and means connecting the pull cable to the gate operable to transmit the pull of the cable against the shovel weight to said dump gate whereby upon release of the latch, such pull acts to swing the dump gate rearwardly into overlapping relation with the rear wall.

8. In a self-loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, the improvement comprising a dump gate movably suspended from the body and providing a movable closure for said discharge opening, a releasable latch normally holding the dump gate in position to close the discharge opening, power means operably connected to the shovel to rock it, and means connecting the gate to said power means operable to transmit the pull of the shovel against said power means to said dump gate whereby upon release of the latch such pull tends to open the dump gate.

9. In a self-loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, the improvement comprising a dump gate movably suspended from the body and providing a movable closure for said discharge opening, latch means on the body holding the dump gate in position to close the opening, a trip operable to release the latch means, a pull cable anchored to the dump gate for opening it, means connecting the pull cable to the shovel for rocking the shovel upwardly and rearwardly, and means connecting the trough to the dump gate operable to bring the dump gate into position to close the discharge opening upon movement of the trough to its load receiving position.

10. In a self-loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, the improvement comprising a dump gate movably suspended from the body and providing a movable closure for said discharge opening, latch means on the body holding the dump gate in position to close the opening, a trip operable to release the latch means, means to rock the shovel and trough upwardly and rearwardly from load receiving position, and a connection from said last named means to the dump gate operable when the trough is rocked upward from loading position, upon release of the latch means, to open the dump gate.

11. In a self loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between side walls of the trough to crowd material thereon into the trough, the improvement comprising a dump gate movably suspended from the body and providing a movable closure for said discharge opening, power means operably connected to the shovel to rock it, means connecting the dump gate to the power means for opening the gate, means connecting the dump gate to the trough operable by movement of the trough toward horizontal load receiving position to close the gate, and a releasable latch normally holding the gate in closed position.

12. In a self loading transport having a load receiving body, comprising a rear wall and spaced side walls extending forwardly therefrom and means at the bottom of the body and spaced forwardly from the rear wall connecting the side walls together, the body having a discharge opening at the bottom thereof between said side walls and between the rear wall and said means, said transport having a U-shaped trough pivoted at its lower rear edge to said body in front of said opening, said trough being rockable from a horizontal load receiving position upwardly and rearwardly between said side walls to crowd material thereon into the body, said transport also having a trough like shovel extending forwardly from said trough and pivoted at its lower rear edge to the trough, said shovel being rockable from a horizontal load receiving position upwardly and rearwardly between the side walls of the trough to crowd material thereon into the trough, and the shovel and trough having connecting means therebetween limiting the angular movement of the shovel relative to the trough whereby upward and rearward movement of the shovel beyond position to crowd material into the trough also moves the trough upwardly and rearwardly, a dump gate movably suspended from the body and providing a movable closure for said discharge opening, a latch holding the gate closed, power means operably connected to the shovel for rocking the shovel upwardly and rearwardly, means connecting the dump gate to said power means operable upon release of the latch to open the dump gate when the shovel and trough are raised to crowd material into the body, and means connecting the trough to the dump gate operable to bring the dump gate into position to close the discharge opening upon movement of the trough to its load receiving position.

References Cited in the file of this patent

UNITED STATES PATENTS

| | | |
|---|---|---|
| 1,819,578 | Watt | Aug. 18, 1931 |
| 2,109,440 | Villerup | Feb. 22, 1938 |
| 2,347,455 | Beckwith | Apr. 25, 1944 |
| 2,518,471 | Hayes | Aug. 15, 1950 |

FOREIGN PATENTS

| | | |
|---|---|---|
| 215,033 | Great Britain | Apr. 29, 1924 |